United States Patent Office 3,429,870
Patented Feb. 25, 1969

3,429,870
REACTIVE TRIAZINE CONTAINING AZO DYESTUFFS
Luigi Carati, Milan, Ugo Moiso, Cesano Maderno, and Giulio Craia, Saronno, Italy, assignors to Aziende Colori Nazionali Affini ACNA S.p.A., Milan, Italy
No Drawing. Filed Aug. 6, 1965, Ser. No. 477,931
Claims priority, application Italy, Aug. 10, 1964
17,310/64
U.S. Cl. 260—153      8 Claims
Int. Cl. C09b 62/50, 29/38, 29/16

ABSTRACT OF THE DISCLOSURE

Dyestuffs for dyeing cellulose and polyamide having the general formula

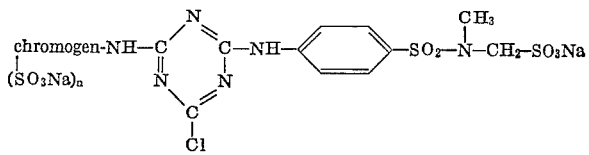

where $n=2$, 3 or 4 and the chromogen is a residue of azo, metallized azo, anthraquinone or phthalocyanine dyestuff. Foregoing dyestuffs prepared by reacting cyanuric chloride with Na salt of N′-methyl-sulfanilamido-methanesulfonic acid and then condensing the product with the dyestuff residue. Textile materials dyed with foregoing dyestuffs.

---

The present invention relates to a new class of reactive triazine dyestuffs which are particularly suitable to obtain dyeings having a high fastness to wet treatments on cellulose and polyamide materials.

Previously, a class of reactive dyestuffs of the general formula

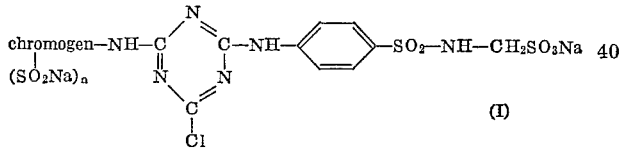

where $n=2$ or 3, and wherein the chromogen was selected from the group consisting of azo dyestuff, azo metallized dyestuff and anthraquinone dyestuff, has been disclosed.

It has now been surprisingly found that the dyestuffs to the general formula

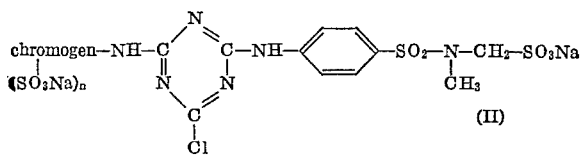

where $n=2 \ldots 4$ and wherein the chromogen radical is selected from the group consisting of azo dyestuff, azo metallized dyestuff, anthraquinone dyestuff and phthalocyanine dyestuff possess particularly good characteristics of affinity towards the fibers, in combination with good solubility and fastness characteristics. These dyestuffs may be characterized as phenyl-azophenyl, phenyl-azo-naphthyl, or phenyl-azo-pyrazolone dyestuff.

The dyeing advantages of the dyestuffs of the general Formula II, result from the following observations:

(1) The dyestuff, wherein the radical

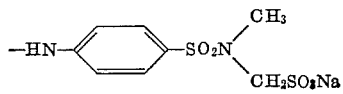

is bound to a carbon atom of the triazinyl nucleus, due to its controlled affinity, is more uniformly distributed in the fiber and is fixed to it by means of a physical or chemophysical bond. Consequently, the dyestuff is in the most suitable condition to react with the fiber to a high degree, at the same time causing an excellent exhaustion of the bath.

(2) The dyestuff not chemically fixed on the fiber is quantitatively removed owing to its good diffusion-deriving from the affinity and solubility which it possesses to the most suitable degree—by subsequent soaping at the boiling temperature, thus allowing one to obtain high fastness to wet treatments.

The reactive dyestuffs of the general Formula II can be prepared by reacting cyanuric chloride with the sodium salt of N′-methyl-sulfanilamido-methanesulfonic acid and subsequently condensing the condensation product obtained with a chromogenic residue of a dyestuff selected from the group consisting of azo dyestuff, metallized azo dyestuff, anthraquinone dyestuff and phthalocyanine dyestuff.

They may also be prepared by condensing the chromogenic part (such as an azo, a metallized azo, an anthraquinone or phthalocyanine dyestuff) with the sodium salt of N′-methyl-sulfanilamido-methanesulfonic acid.

The dyestuffs of the present invention are suitable both for dyeing and for printing many types of materials, such as natural and synthetic polyamides, wool, silk, superpolyamides, and are particularly efficacious for polyhydroxylated materials having a fibrous structure, such as regenerated cellulose, flax, and cotton.

The dyeing and printing of cellulose materials and natural and synthetic polyamides with the dyestuffs of the present invention are substantially carried out according to known techniques.

The parts and percentages, except when otherwise indicated, are to be understood as being expressed by weight.

EXAMPLE 1

49 parts by volume of an aqueous solution of monomethylamine having a concentration of 31.8% parts/vol. are dropwise added to 300 parts by volume of a solution of sodium oxymethanesulphonate having a concentration of 35.5% parts/vol. in 3 hours at 55–60° C., while keeping the pH between 7.5–8.5 by means of suitable regulation of the dropping of the methylamine. To the thus obtained reaction mixture, 245 parts of N-p-acetyl-aminobenzene-sulphonylchloride, having a concentration of 47.8% are added.

The pH is kept at a value of 6.5–7 for 10 hours by means of addition of 425 parts by volume of a solution of $Na_2CO_3$ having a concentration of 10% parts/vol. When constant pH values of 6.5–7 are reached, the mixture is filtered and 200 parts of rock salt are added to the filtrate at room temperature. It is then stirred for 2 hours and then the sodium salt of N-p-acetyl-amino-benzene-sulphonamido-N′-methyl-N′-omega - methane - sulphonic acid is filtered and subsequently washed on the filter with a solution of purified rock salt.

The aqueous paste obtained, having an ivory-white color, is subsequently added to a solution of 40 parts/vol. of concentrated HCl in 350 parts of water. The whole is maintained at about 60° C. for 7 hours; then it is filtered at room temperature and washed with water until the chlorides are removed. The paste cake is dried on $CaCl_2$.

A white powder, which under analysis reveals the chemical structure of N′-methyl-sulfanilamido-methanesulfonic acid, is obtained with good yields.

EXAMPLE 2

9.22 parts (0.05 g.-mol) of cyanuric chloride in 50 parts of acetone are poured in a thin trickle onto 80 parts of ice and 80 parts of water; after 2–3 minutes of stirring, and while keeping the temperature below 3° C. by means of suitable and gradual additions of finely ground ice, the solution, at pH 6.5, of 14.0 parts (0.05 g.-mol) of N'-methyl-sulfanilamido-methanesulfonic acid, prepared as described in Example 1 (M.P. 280.3) in 150 parts of water of about 18° C. and 3.5 parts of $Na_2CO_3$, is charged in 15 minutes; the pH of the milky suspension is kept between 6.0 and 6.5 by means of gradual dropping of 25–26 parts by volume of an aqueous $Na_2CO_3$ solution having a concentration of 10% parts/vol.

After 1 to 1.5 hours of stirring at 2–3° C., when the pH is stabilized and the diazotizable amine group has disappeared, the solution, having a pH of 7 obtained by dissolving with NaOH the coupling product (in acetate medium) of the diazo of 15.1 parts (0.05 g.-mol) of 2-naphthylamine-4,8-disulphonic acid with 9.33 parts (0.05 g.-mol) of 3-amino-acetanilide hydrochloride, is introduced. The whole is heated to about 40° C. in 30 minutes and the condensation solution is kept at this temperature for 5 hours, while constantly bringing the pH back to 6.5 by means of gradual addition of 25–26 parts by volume of an $Na_2CO_3$ solution having a concentration of 10%.

After filtration to remove occasional mechanical impurities, the solution is salted out with NaCl in order to precipitate the dyestuff.

amido-methanesulfonic acid in 150 parts of water at about 18° C. and 3.5 parts of $Na_2CO_3$; by means of gradual dropping of 25–26 parts by volume of an aqueous $Na_2CO_3$ solution having a concentration of 10% parts/vol. the pH of the milky suspension is maintained between 6.0 and 6.5.

After 1 to 1.5 hours of stirring at 2–3° C., when the pH is stabilized and the diazotizable amine group disappeared, 9.4 parts (0.05 g.-mol) of 2,4-diaminobenzenesulphonic acid, previously solubilized in 100 parts of water, are added and the whole is heated to about 40° C. in 1 hour.

After 1 to 1.5 hours of stirring at this temperature, always keeping the pH of the condensation solution between 6.0 and 6.5 by means of gradual addition of 25–26 parts by volume of an $Na_2CO_3$ solution having a concentration of 10%, the stabilization of the pH occurs.

After filtering off occasional mechanical impurities the condensation solution is cooled at 0–3° C. and first 3.45 parts of $NaNO_2$ (in the form of an aqueous solution having a concentration of 23% parts/vol.) and then 14.7 parts of HCl, sp. p.$_{20°}$ c.=1.175 are added to it; after 20 minutes of stirring at 0–3° C. the suspension of the diazo compound is charged in 15 minutes into the solution at 20° C. of 16.6 parts (0.515 g.-mol) of 1-(2,5-dichloro-4-sulfophenyl)-3-methyl-5-pyrazolene in 140 parts of water and 15 parts of $Na_2CO_3$.

It is left under stirring until the diazo compound has disappeared.

The dyestuff.

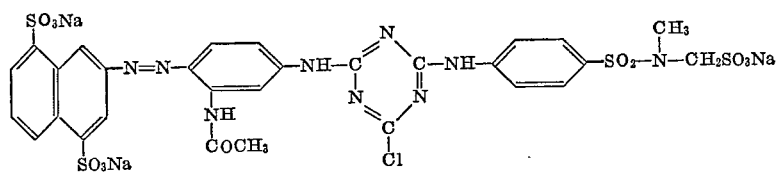

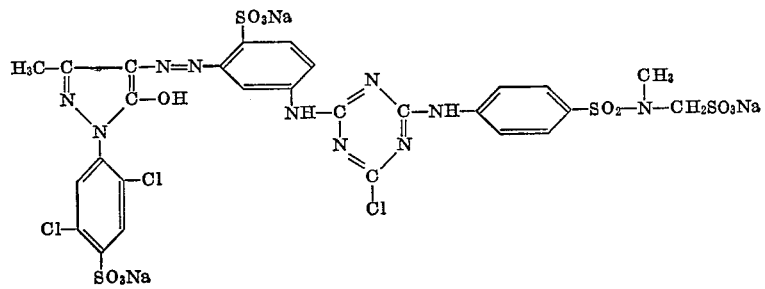

which is then filtered under vacuum—leaving it to dry as much as possible—and finally dried in an oven at about 35–40° C. for 60 hours.

When dissolved in water it gives an orange yellow solution, which dyes, with excellent exhaustion, cotton in a reddish yellow shade with good fastness after alkaline thermofixing.

The same dyestuff is obtained when carrying out the condensation in the opposite sense, i.e., by condensing with cyanuric chloride first the monoazo compound and then the N'-methyl-sulfanilamido-methanesulfonic acid.

EXAMPLE 3

9.22 parts (0.05 g.-mol) of cyanuric chloride in 50 parts of acetone are poured in a thin trickle onto 80 parts of ice and 80 parts of water; after 2–3 minutes of stirring and while keeping the temperature below 3° C. by means of suitable and gradual addition of finely ground ice, it is added in 15 minutes to the solution, having a pH of ≅6.5, of 14.0 parts (0.05 g.-mol) of N'-methyl-sulfanilis precipitated by salting out with KCl, filtered under vacuum—leaving it to dry as much as possible—and finally dried in an oven at about 35–40° C. for 60 hours.

Said dyestuff, when dissolved in water, gives a lemon yellow solution and dyes, with excellent exhaustion, cotton in a greenish yellow shade with good fastness after alkaline thermofixing.

The same dyestuff is obtained when carrying out the condensation in the opposite sense, i.e., when condensing with cyanuric chloride first the 2.4 diamino benzenesulfonic acid and then the N'-methyl-sulfanilamido-methanesulfonic acid.

EXAMPLE 4

The suspension of the diazo compound prepared as described in Example 3 is charged in 15 minutes into the solution of 21.8 parts (0.515 g.-mol) of 1-benzamido-8-naphthol-3,6-disulphonic acid in 250 parts of water and 15 parts of $Na_2CO_3$, kept at 20° C.

After coupling the pH is brought to 7 by means of addition of HCl and the dyestuff

EXAMPLE 6

57.8 parts (0.1 g.-mol) of the monoazo compound ob-

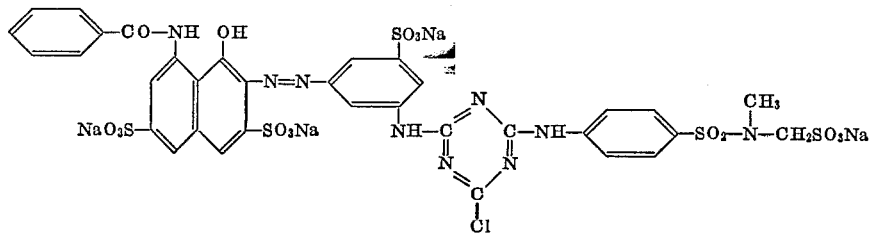

is precipitated by salting out with KCl, filtered under vacuum—leaving it to dry as much as possible—and finally dried in an oven at about 35–40° C. for 60 hours.

Said dyestuff, when dissolved in water, gives a bluish red solution which dyes, with excellent exhaustion, cotton in a red shade having good fastness after alkaline thermofixing.

The same dyestuff is obtained when carrying out the condensation in the opposite sense, i.e., when condensing with cyanuric chloride first the 2,4-diaminobenzenesulfonic acid and then the sulfanilamido-N'-methyl-methanesulfonic acid.

EXAMPLE 5

The suspension of the diazo compound prepared according to Example 3 is charged in 30 minutes into a solution of 14.5 parts (0.515 g.-mol) of carbamylisogamma acid in 180 parts of water having a pH 7, previously salted to a concentration of 10% parts/vol. with NaCl and cooled to about 2–3° C.; contemporaneously with the addition of the diazo compound about 65 parts by volume of an aqueous solution of $Na_2CO_3$, having a concentration of 10% parts/vol. are dropwise added in order to maintain the pH constant between 7.0 and 7.5.

The whole is left under stirring at about 2–3° C. until the diazo compound has disappeared.

The obtained dyestuff having the structure tained by alkaline coupling (pH 8.5–9) of the diazo compound of 1-amino-2-naphthol - 6-nitro-4-sulphonic acid with 2-amino-5-naphthol - 7-sulphonic acid, are suspended in 250 parts of water at 50° C. and an aqueous cobalt sulphate solution is added under stirring to them so as to reach a ratio of 0.055 gram atoms of cobalt per 0.1 g. mol of monoazo compound; the suspension is metallized at 70° C. in 1 to 1.5 hours at a pH of 6–6.5, while maintaining said pH by means of addition of caustic soda 5 N.

The obtained solution is filtered, cooled at room temperature (about 20° C.) and added to the mono-condensate suspension of cyanuric chloride and sodium sulphanyl-amido-N'-methyl-N'-methanesulphonate, prepared as described below:

A solution of 22.2 parts of cyanuric chloride (M.W. 184.4) in 140 parts of acetone is poured onto 60 parts of ice, 60 parts of cold water and 1–2 drops of Emulgator (MK) (in solution having a concentration of 5%); 0.12 g.-mol of the sodium salt of N'-methyl-sulfanilamido-methanesulfonic acid (M.W. 280.3) in 300 parts of cold water are then added to the suspension obtained.

The whole is stirred for 1.5 hours at a temperature of 0–5° C. and at a pH kept at 6–6.5 by dropwise addition of an $Na_2CO_3$ solution having a concentration of 10% parts/vol. until a negative reaction of the diazotization sample is reached.

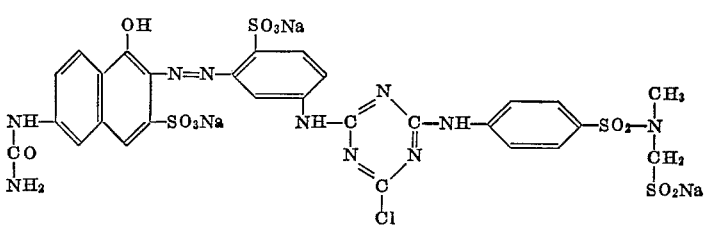

is filtered under vacuum, washed with brine having a concentration of 10%, left to dry as much as possible, and finally dried in an oven at 35–40° C. for 60 hours.

When dissolved in water said dyestuff gives an orange solution which dyes, with excellent exhaustion, cotton in an orange shade having good fastness after alkaline thermofixing.

The same dyestuff is obtained when the condensation is carried out in the opposite sense, i.e., when condensing with cyanuric chloride first the 2,4-diaminobenzenesulfonic acid and then the N'-methyl-sulfanilamido-methanesulfonic acid.

The mixture, containing the suspension of the mono-condensate thus obtained and the solution of the metallized monoazo compound, is heated to 40° C. and kept at said temperature for about 2 hours; the pH is brought to 6.5–7 and kept at said value by dropwise addition of an $Na_2CO_3$ solution having a concentration of 10% (parts/vol.).

It is left to cool under stirring at room temperature (about 20° C.) and salted out at a concentration of 15% (parts/vol.) with NaCl. Then it is filtered and dried at 40° C. After grinding a dark, highly soluble powder is obtained having the structure:

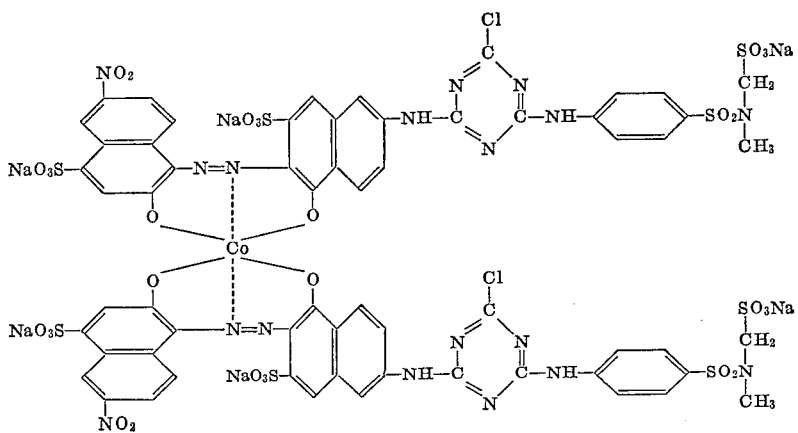

which dyes cellulose fibers in a violet brown shade having a good substantivity and reactivity.

EXAMPLE 7

57.8 parts of the monoazo compound obtained by alkaline coupling (pH 8.5–9) of the diazo compound of 1-amino-2-naphthol-6-nitro-4-sulphonic acid with 2-amino-5-naphthol-7-sulphonic acid, are suspended in 250 parts of water at 50–60° C. and a solution of sodium-chromium-salicylate, having a concentration of 2.6% of Cr (prepared according to known modalities) is added thereto so as to reach a ratio of 0.08 gram atoms of Cr per 0.1 mol of monoazo compound; the metallization is carried out at the boiling temperature, in a period of 2–3 hours and at a pH of 10.5–10.6, obtained by means of suitable additions of caustic soda (about 5 N).

The resulting solution is filtered cooled at 20° C. neutralized at a pH of 7 and added to the suspension of the monocondensate between cyanuric chloride and sodium N'-methyl-sulfanilamido-methanesulfonate, the preparation of which was described in Example 2 or 6.

The resulting mass is heated to 40° C. and kept at said temperature for about 2 hours; the pH is brought to 6.5–7 and is kept at said value by dropwise adding an $Na_2CO_3$ solution having a concentration of 10% (parts/vol.).

The whole is left to cool under stirring at room temperature (about 20° C.), and salted out at a concentration of 20% (parts/vol.) with NaCl and the pH is brought to 4 with HCl 1:1.

The precipitate obtained is filtered and dried at 40° C. After grinding a dyestuff is obtained in the form of a black powder having the structure:

greenish grey shades having good fastness characteristics, excellent exhaustion of the dyeing bath.

EXAMPLE 8

2-amino-1,4-benzenedisulfonic acid is directly diazotized and coupled with p-cresidine in a sodium acetate buffered medium. The amino-azo compound is diazotized and coupled with 2-amino-5-naphthol-7-sulphonic acid in an alkaline medium.

The diazo compound obtained, is transformed into its copper complex by heating it for 20 hours at 95° C. with an aqueous solution of ammoniacal copper sulphate.

After cooling, the copper complex of the diazo compound is precipitated by salting out at a concentration of 20% (parts/vol.) with NaCl, at pH of about 4, and separated by filtration.

76.5 parts of the tri-sodium salt of the metallized diazo compound (M.W. 765) are dissolved in 500 parts of hot water by neutralizing at a pH of 7 with 5 N caustic soda, and added to the suspension of 0.12 mol of the monocondensate between cyanuric chloride and sodium N'-methyl-sulfanilamido-methanesulfonate, the preparation of which was described in Examples 2 and 6.

The resulting mass is heated to 40° C. and kept at said temperature for 2 to 3 hours; during said period the pH is brought to 6.5–7 and kept at said value by means of dropwise addition of $Na_2CO_3$ solution having a concentration of 10% (parts/vol.).

The whole is left to cool at room temperature (about 20° C.).

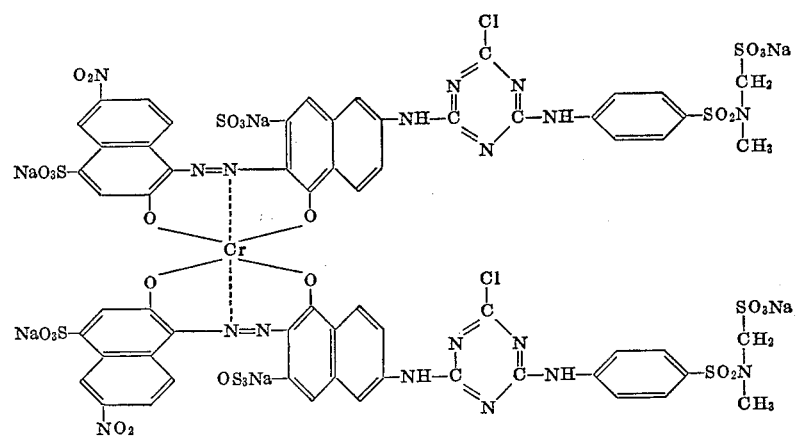

which dyes, with excellent reactivity, cellulose fibers in

The dyestuff is separated by means of salting out at a concentration of 20% (parts/vol.) and at a pH of 4, and filtration. After drying at 40° C. and grinding a blue powder is obtained having the structure:

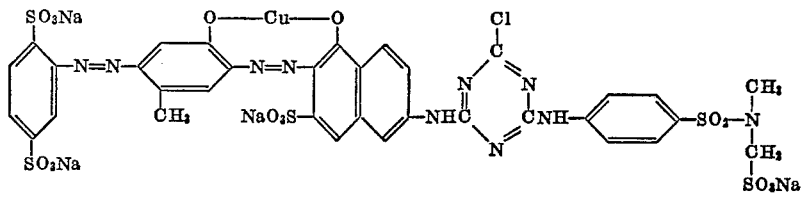

which dyes cellulose fibers in a navy greenish blue shade with good substantivity and reactivity.

EXAMPLE 9

4-amino-azo-benzene-3,4'-disulphonic acid is diazotized indirectly at 20° C. and coupled with 1-amino-naphthalene-6-sulphonic acid in a medium buffered with sodium acetate.

The diazo compound obtained is separated by means of salting out and filtration.

59 parts of the previously prepared amino-diazo compound (M.W. 591) are suspended in 600–700 parts of water and neutralized at a pH of 7 with a 1:1 NaOH solution.

The resulting solution is added to the suspension obtained by pouring the solution of 18.5 parts of cyanuric chloride in 140 parts of acetone onto 50 parts of water, 50 parts of ice and 1–2 drops of Emulgator MK (CH$_3$—(CH$_2$)$_n$—CH$_2$—SO$_3$Na, $n$=about 9–13)

The whole is kept under stirring at 0–5° C. for 1 hour and at a pH of about 6 by addition of Na$_2$CO$_3$ in solution having a concentration of 10% (parts/vol.). The solution, at pH of 7, of 33.6 parts of the sodium salt of N'-methylsulfanilamido-methanesulfonic acid (M.W. 280) in 300 parts of water is added to the solution obtained.

The solution is heated to 40° C. and kept for 4 hours at this temperature and at a pH of 6.5–7 by means of dropping of an Na$_2$CO$_3$ solution having a concentration 10% (parts/vol.). It is left to cool at room temperature, salted out at a concentration of 20% (parts/vol.) and filtered.

The drying is carried out at 40° C.

After grinding a dyestuff is obtained in the form of a brown powder having the structure:

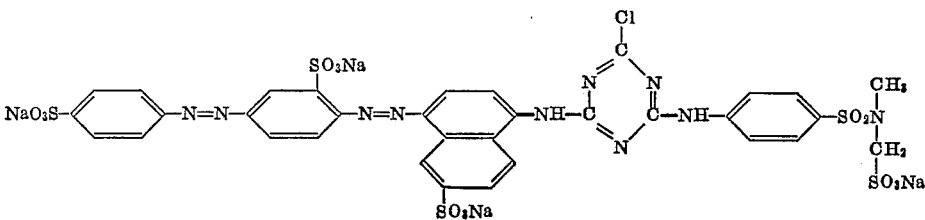

which dyes cellulose fibers in a yellowish-brown shade with good substantivity and reactivity.

EXAMPLE 10

A solution of 22.2 parts of cyanuric chloride in 140 parts of acetone is poured into a mixture of 60 parts of ice and 60 parts of water.

A milky suspension is obtained to which a solution of 33.6 parts of the sodium salt of N'-methyl-sulfanilamido-methanesulfonic acid in 300 parts of cold water is added.

The whole is stirred for 1.5 hours at a temperature of 0–5° C. and a pH of 6–6.5, maintained by means of addition of Na$_2$CO$_3$ until a negative reaction of the diazotization test is reached.

A solution of 95 parts of the intermediate of the following structure

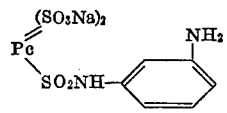

Pc=nucleus of copper phthalocyanine in 2000 parts of water are added to this solution.

The mixture obtained is left under stirring at 20–25° C. for about 12 hours, while the pH is maintained at 6.5–7.5 by means of suitable additon of NaHCO$_3$.

When the condensation is completed a dyestuff is separated by salting out, having the structure

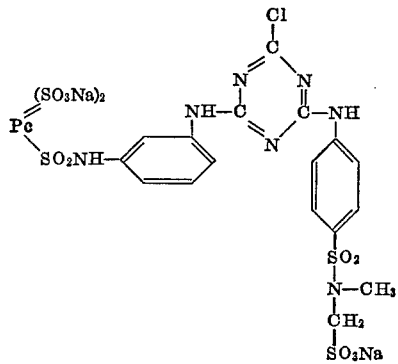

which dyes cellulose fibers, in the presence of acid-binding substances, in a turquoise shade having excellent fastness characteristics.

EXAMPLE 11

By operating as described in the preceding example, but using the intermediate having the following structure

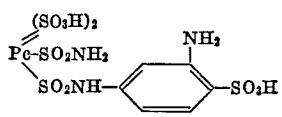

a dyestuff having similar characteristics is obtained.

EXAMPLE 12

By operating as described in Example 10, but using the intermediate having the following structure

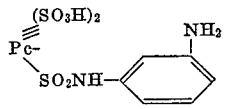

a dyestuff having analogous dyeing characteristics is obtained.

EXAMPLE 13

50 parts of the mono-condensate between cyanuric chloride, and the sodium salt of N'-methyl-sulfanilamido-methanesulfonic acid, prepared as described in Example 1, are added to a suspension of 53.3 parts of the intermediate having the following structure

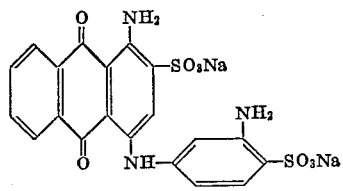

in 2000 parts of water. 10 parts of $NaHCO_3$ are added to the mixture and it is left under stirring until the condensation is completed.

By means of salting out a blue dyestuff of the following structure is obtained:

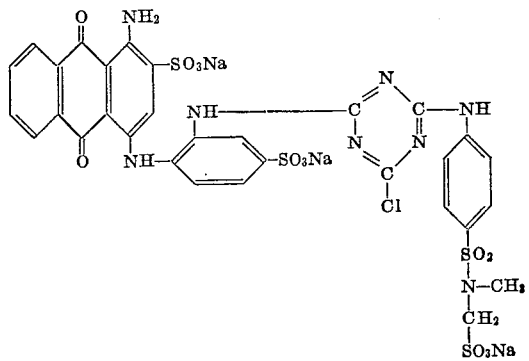

In the presence of acid-binding substances it dyes cellulose fibers in shades very fast to wet treatments.

EXAMPLE 14

By operating as described in the preceding example, but using as intermediate the 1-amino-4-(3'-amino-anilino)-2-anthraquinonesulphonic acid, a dyestuff is obtained which has the following structure:

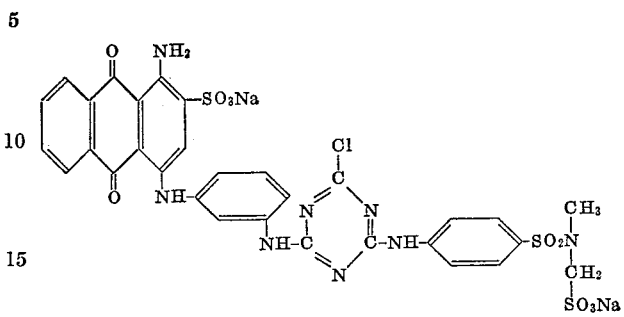

and which dyes in a deeper red shade than the dyestuff obtained according to Example 14.

EXAMPLE 15

The solution obtained by coupling at 3–5° C. and at a pH of about 9 the diazo of 18.9 parts (0.1 g.-mol) of the 2-amino-1-phenol-4-sulphonic acid with 31.9 parts (0.1 g.-mol) of H acid was copper metallized at 40° C. and at a pH 5 (using as buffering agent 27.5 parts of crystallized sodium acetate) with 25 parts (0.1 g-mol) of $CuSO_4 \cdot 5H_2O$; after one hour at 40° C. the solution was salted off to 20% parts/vol. with NaCl and the whole was filtered off at 20° C.

The solution of the copper metallized monoazo thus obtained having a pH=7 (26.2 parts corresponding to 0.045 g.-mol in 200 ml. of water) is poured on the condensation product of 0.05 g.-mol of cyanuric chloride and 0.05 g.-mol of N'-methyl-sulfanilamido-methanesulfonic acid (prepared according to modalities described in Example 2). The solution, heated within 30 minutes at about 40° C., is kept at this temperature for 3 hours maintaining the pH at the constant value of 6.5 by addition of a 10% $Na_2CO_3$ solution.

The solution is then made clear and then is salted off with KCl in order to precipitate the dyestuff

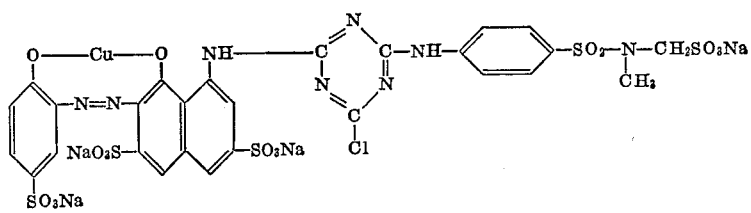

which is filtered under vacuum and then dried at about 35–40° C. This dyestuff dissolves in water and gives a violet solution which dyes cotton in violet with good exhaustion and good fastness after alkaline heat treatment.

The same dyestuff is obtained by carrying out the condensations in the opposite sense, that is condensing with the cyanuric chloride first the copper metallized monoazo and then the N'-methyl-sulfanilamido methane-sulfonic acid.

EXAMPLE 16

The hydrolyzed and neutralized at pH 7 solution of the product obtained by coupling at 3° C. and pH 8–8.5 of The condensation mass is heated at about 40° C. within 30 minutes and is kept at this temperature for 6 hours, while maintaining the pH at the constant value of 6.5 by gradual addition of a 10% $Na_2CO_3$ solution.

The whole is salted off with NaCl having been made clear, the thus precipitated dyestuff:

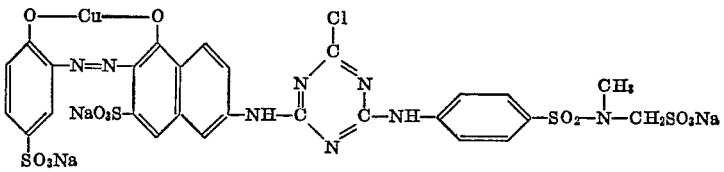

0.04 g.-mol of acetyl H acid (successively hydrolyzed with 4% NaOH) is poured on the condensation product of 0.05 g.-mol of cyanuric chloride with 0.05 g.-mol of N'-methyl-sulfanilamido methanesulfonic acid (prepared according to the modalities described in Example 2).

The whole is heated at about 40° C. within 30 minutes and the condensation mass is kept at this temperature for 6 hours, while maintaining the pH at the constant value of 6.5 by gradual addition of a 10% $Na_2CO_3$ solution.

The solution is made clear and then is salted off with NaCl; the thus precipitated dyestuff is filtered under vacuum and is then dried at about 35–40° C.

This dyestuff dissolves in water and gives an intensively colored violet-reddish solution which dyes cotton in rubine shade with good exhaustion and good fastness after alkaline heat treatment.

The same dyestuff is obtained condensing the cyanuric chloride first with the copper metallized monoazo and then the N'-methyl-sulfanilamido-methanesulfonic acid.

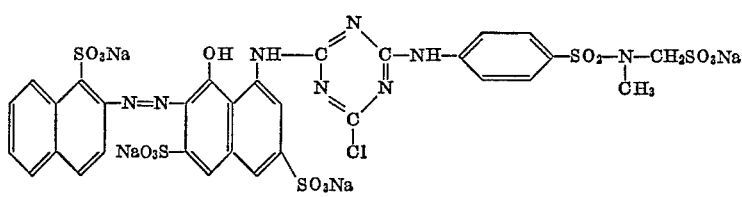

is filtered under vacuum and then is dried at about 35–40° C.

This dyestuff is water soluble and gives a red-bluish solution which dyes cotton in red-bluish shade with very good exhaustion and good fastness after alkaline heat treatment.

The same dyestuff is obtained by carrying out the condensations in the opposite sense, that is first condensing the cyanuric chloride with the hydrolyzed monoazo, and then the N'-methyl-sulfanilamido-methanesulfonic acid.

EXAMPLE 17

The solution obtained by coupling at 3–5° C. and pH 9–9.2 the diazo of 18.9 parts (0.1 g.-mol) of the 2-amino-1-phenol-4-sulphonic acid with 23.9 parts (0.1 g.-mol) of the 1-naphthol-6-amino-3-sulphonic acid was copper metallized at 60–65° C. and at pH 5 (using as buffering agent 27 parts of crystallized sodium acetate) with 25 parts (0.1 g.-mol) of $CuSO_4 \cdot 5H_2O$; after 2–3 hours at 60–65° C. the whole was cooled at about 20° C. and then was salted off to 10% with NaCl and filtered. 0.04 g.-mol of the copper metallized monoazo thus obtained, after solubilization with 400 parts of water, are poured on the condensation product of 0.05 g.-mol of cyanuric chloride with 0.05 g.-mol of N'-methyl-sulfanilamido-methanesulfonic acid (prepared according to the modalities described in Example 2).

EXAMPLE 18

The solution at pH 7 of 12 parts (0.05 g.-mol) of 1-naphthol-6-amino-3-sulphonic acid in 200 parts of water is poured on the condensation product of 0.05 g.-mol of cyanuric chloride with 0.05 g.-mol of N'-methyl-sulfanilamido-methanesulfonic acid, prepared according to the modalities described in the Example 2.

The whole is heated at 40° C. within one hour and is kept at this temperature for one hour and 30 minutes, while the pH of the condensation solution is kept constant at a value between 6 and 6.5 by gradual addition of a 10% $Na_2CO_3$ solution; after the stabilization of the pH and after the disappearing of the diazo-table amino group, the solution of the dicondensation product is cooled at 3–5° C. and at this temperature the diazo of 11.5 parts (0.05 g.-mol) of 4-acetoamino-2-sulpho-aniline, is poured unto it while the pH of the copulation mass is maintained between 7 and 8 by gradual addition of a 10% solution of $Na_2CO_3$.

After salting off with NaCl, the dyestuff thus precipitated

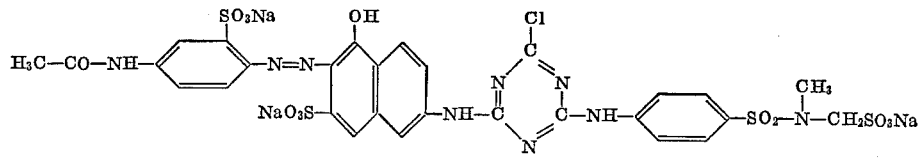

is filtered under vacuum and then is dried at about 35–40° C.

This dyestuff dissolves in water and gives a brilliant red solution which dyes cotton in a scarlet shade with good exhaustion and with good fastness after alkaline heat treatment.

EXAMPLE 19

The solution, obtained by coupling the diazo of 13.7 parts (0.1 g.-mol) of anthranilic acid with 23.9 parts (0.1 g.-mol) of 1-naphthol-6-amino-3-sulphonic acid at a pH between 8 and 8.5, was copper metallized with 25 parts (0.1 g.-mol) of CuSO$_4$·5H$_2$O and 27.5 parts of crystallized sodium acetate; after one hour at 40° C. the whole filtered off.

0.05 g.-mol of the copper metallized monoazo thus obtained are added to the condensation product of 0.05 g.-mol of cyanuric chloride with 0.05 g.-mol of N'-methyl-sulfanilamido-methanesulfonic acid (prepared according to the modalities described in the Example 2).

The condensation mass is heated at about 40° C. within 30 minutes and is maintained at this temperature till the condensation is complete, while the pH is continuously adjusted at the value of 6.5 by gradual addition of a 10% Na$_2$CO$_3$ solution.

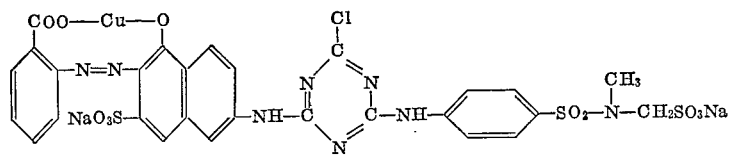

After salting off with NaCl, the thus precipitated dyestuff
is filtered under vacuum and then dried at about 35–40° C.

This dyestuff dissolves in water and gives a brown-reddish solution which dyes cotton in a brown shade with good exhaustion and good fastness after alkaline heat treatment.

The same dyestuff is obtained by condensing with the cyanuric chloride first the N'-methyl-sulfanilamido-methanesulfonic acid and then the 1-naphthol-6-amino-3-sulphonic acid, coupling then on this dicondensation product the diazo of the anthranilic acid at 3–5° C. and at a pH comprised between 7.5–8 and finally carrying out the copper metallization with CuSO$_4$·5H$_2$O at about 40° C. and at a pH=5.

EXAMPLE 20

2 parts of the dyestuff of Example 10 are dissolved in 100 parts of water.

With this solution a cotton fabric is impregnated, then squeezed until it retains 75% of its weight in solution, whereafter it is treated for 10 minutes at 75° C. in a bath containing 5–10 g./l. of trisodium phosphate, 1 ml./l. of NaOH 36° Bé. and 200 g./l. of NaCl.

It is rinsed in the cold, then at boiling temperature and then dried.

The cotton fabric appears to be dyed in a brilliant turquoise blue shade having good fastness.

EXAMPLE 21

30 parts of the dyestuff prepared according to Example 2 are dissolved in 1000 parts of distilled water.

With said solution a dry fabric of cellulose fiber is impregnated, then squeezed until it retains 75% of its weight of solution; the fabric is then dried at 70–80° C. and subsequently impregnated in a thus composed solution:

25% (parts/vol.) of anhydrous sodium sulphate
3% (parts/vol.) of NaOH 36° Bé.
1% (parts/vol) of sodium meta-nitro-benzenesulphonate
and squeezed until it retains 75% of its weight of solution.

This fabric is subsequently steamed for 1 minute at 105° C., thoroughly washed with cold and then with hot water, and finally soaped at the boiling temperature for 20 minutes, and rinsed and dried.

The cotton fabric appears to be dyed in a reddish yellow shade having excellent fastness to washing.

EXAMPLE 22

2 parts of the dyestuff prepared according to Example 6 are dissolved in 2000 parts of distilled water at 50–55° C.

Into the thus obtained bath, 100 parts of cotton in the form of skeins are immersed and the dyeing is begun, while stirring intermittently.

After 20 minutes from the start, 80 parts of anhydrous sodium sulphate are added at a temperature of 60° C., and after a further 20 minutes, with the bath brought to a temperature of 70° C., the addition is completed with 120 parts of anhydrous Na$_2$SO$_4$.

The temperature of the bath is brought to 80° C. in 10 minutes and in two times, in a total period of 20 minutes, 300 parts of an Na$_2$CO$_3$ solution, having a concentration of 10%, are introduced.

The dyeing is continued at a temperature of 80–85° C. for further 60 minutes.

Then the skeins are removed from the dyeing bath, rinsed with cold water and soaped for 30 minutes at the boiling temperature in a solution having a concentration of 3% of Marseille soap, by goods/bath ratio of 1:50.

The cotton appears to be dyed in a violet-brown shade having excellent fastness to wet treatments.

EXAMPLE 23

2 parts of the dyestuff prepared according to Example 10, mixed with 2 parts of NaCO$_3$ and 20 parts of urea, are dissolved in 80 parts of water.

A cotton fabric is impregnated with the thus obtained solution, squeezed until it retains 75% by weight of the liquid, and dried until the material still contains about 15% of residual moisture. Subsequently the fabric is subjected to the action of dry heat for 5 minutes at a temperature comprised between 140–160° C., rinsed first with cold and then with hot water, and soaped for 15–20 minutes in a solution of nonionic surfactant having a concentration of 0.3%.

It is rinsed once more and then dried.

A fabric dyed in a brillant turquoise blue shade having good fastness is obtained.

EXAMPLE 24

A printing paste of the following composition is prepared:

| | Parts |
|---|---|
| The dyestuff of Example 13 | 30 |
| Urea | 100 |
| Hot water | 310 |
| Sodium m-nitrobenzene-sulphonate | 10 |
| Sodium alginate | 500 |
| Sodium bicarbonate | 50 |

The paste is applied to a mercerized cotton fabric.

The fabric is dried and steamed for 10 minutes. The printing is then washed in running water for 15 minutes and soaped with an aqueous solution containing 2 g./l. of soap, for 10 minutes at the boiling temperature.

It is rinsed and dried.

The intense blue printing thus obtained has very good fastness to washing and to light.

While the present invention has been described with respect to specific examples, it is to be understood that these examples are for purposes of illustration and that the invention is not limited thereto, since many variations and modifications can be practiced without departing from its spirit and scope.

2. The dyestuff of claim 1 having the structure

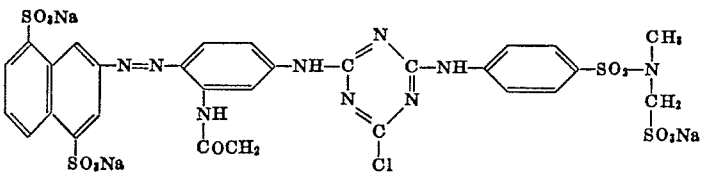

3. The dyestuff of claim 1 having the structure

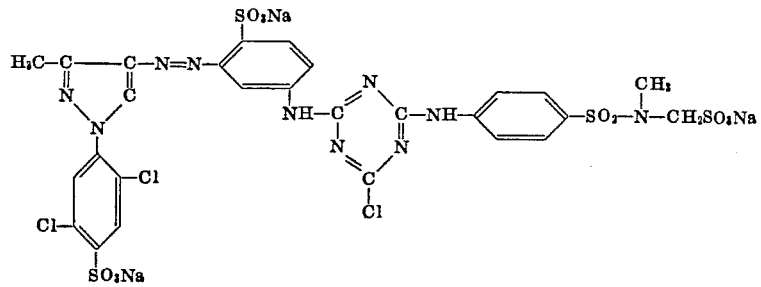

4. The dyestuff of claim 1 having the structure

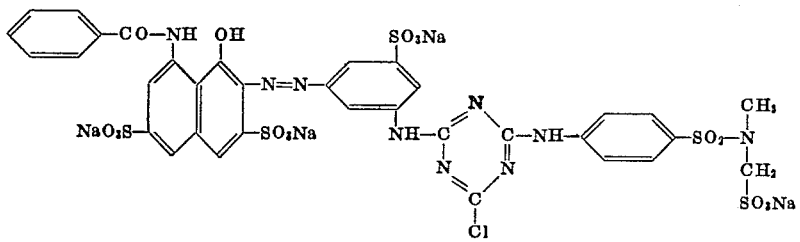

5. The dyestuff of claim 1 having the structure

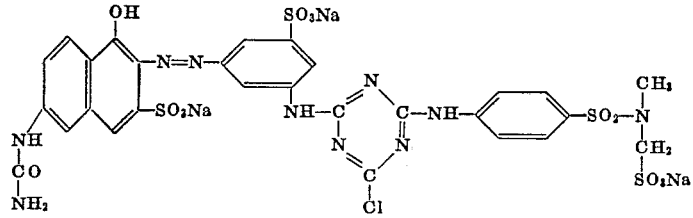

6. The dyestuff of claim 1 having the structure

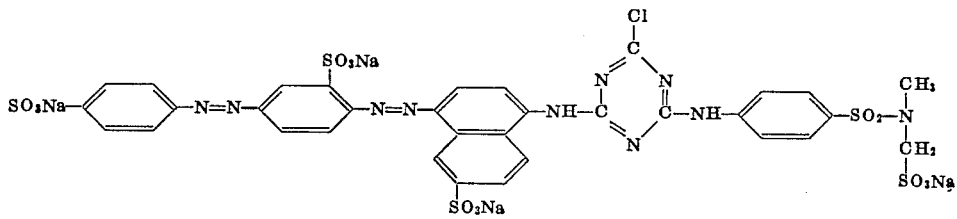

Having described the invention, what it is desired to secure and claim by Letters Patent is:

1. Reactive triazine dyestuff of the formula

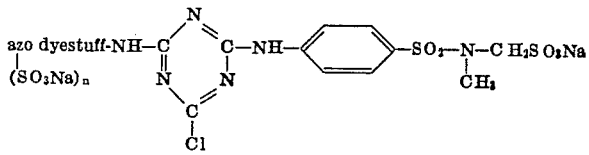

wherein $n$ is an integer from 2 to 4, the azo dyestuff being a phenyl-azo-naphthyl or phenyl-azo-pyrazolone dyestuff, said azo dyestuff being bonded to the —NH— group directly through a phenyl or naphthyl radical of said azo dyestuff.

7. The dyestuff of claim 1 having the structure

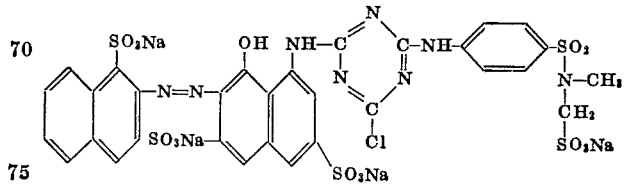

8. The dyestuff of claim 1 having the structure
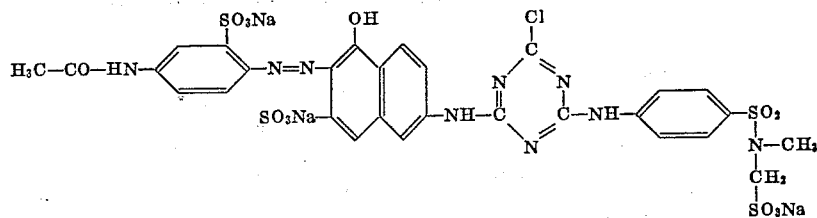
References Cited
UNITED STATES PATENTS
| | | | |
|---|---|---|---|
| 2,424,493 | 7/1947 | Müller et al. | 260—163 |
| 2,769,806 | 11/1956 | Weber | 260—182 |
FOREIGN PATENTS
901,434  7/1962  Great Britain.
CHARLES B. PARKER, *Primary Examiner.*
D. M. PAPUGA, *Assistant Examiner.*
U.S. Cl. X.R.
260—146, 37, 1.96, 310, 163, 199, 195, 191, 249.8, 194, 239.7, 314.5, 374; 8—41, 42, 55, 51, 54.2